United States Patent [19]

Schaulin

[11] Patent Number: 5,059,682
[45] Date of Patent: Oct. 22, 1991

[54] WATER-SOLUBLE PHTHALOCYANINE COMPOUNDS, PROCESS FOR THEIR PREPARATION AND THEIR USE

[75] Inventor: Rudolf Schaulin, Riehen, Switzerland
[73] Assignee: Ciba-Geigy Corporation, Ardsley, N.Y.
[21] Appl. No.: 346,689
[22] Filed: May 3, 1989
[30] Foreign Application Priority Data

Nov. 5, 1988 [CH] Switzerland .................. 1785/88

[51] Int. Cl.$^5$ .................. C09B 56/14; D06P 1/39
[52] U.S. Cl. .................................... 534/702
[58] Field of Search ........................... 534/702

[56] References Cited

U.S. PATENT DOCUMENTS 3,445,449  5/1969  Meininger et al. .................. 540/140

FOREIGN PATENT DOCUMENTS 1176300  9/1961  Fed. Rep. of Germany.
1421156  1/1965  France.
1441328  4/1966  France .................. 534/702
1505753  12/1967  France .................. 534/702
61-87759  5/1986  Japan.
763343  12/1956  United Kingdom.

OTHER PUBLICATIONS

Siegle & Co., Chem. Abs., vol. 62 entry 2860 a (1965).
J. R. Geigy, Chem. Abs., vol. 64 entry 2205 c (1966).
Yamamura et al., Chem. Abs., vol. 105 entry # 192866 t (1986).

*Primary Examiner*—Mukund J. Shah
*Assistant Examiner*—E. C. Ward
*Attorney, Agent, or Firm*—Edward McC. Roberts

[57] ABSTRACT

The compounds of the formula

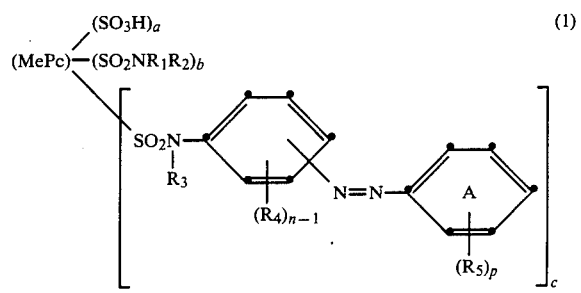

in which the substituents and indices are as defined in claim 1, are green direct dyes for various substrates, in particular cellulosic fibre materials. They are stable to high temperatures and are therefore particularly suitable for the one-bath, one-stage dyeing of polyester/cotton mixed fabrics together with a disperse dye for the polyester fibres, under the dyeing conditions for polyester fibres.

6 Claims, No Drawings

WATER-SOLUBLE PHTHALOCYANINE COMPOUNDS, PROCESS FOR THEIR PREPARATION AND THEIR USE

The present invention relates to novel, water-soluble phthalocyanine compounds, processes for their preparation and their use for dyeing and printing fibre materials, in particular textile fibre materials.

The present invention relates to novel, water-soluble phthalocyanine compounds of the formula

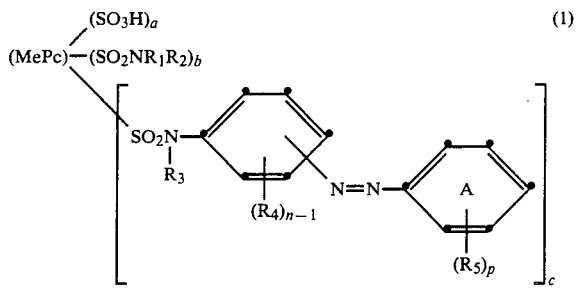

(1)

in which $R_1$ and $R_2$ are identical or different and in each case are hydrogen, hydroxyalkyl having 2 to 5 carbon atoms or carboxyalkyl having 1 to 5 carbon atoms in the alkyl radical or phenyl, or $R_1$ and $R_2$, together with the nitrogen atom, are a heterocyclic ring which can contain further hetero atoms, $R_3$ is hydrogen or methyl, $R_4$ is alkyl or alkoxy each of which has 1 to 5 carbon atoms, $-NHCOR_6$ in which $R_6$ is alkyl or hydroxyalkyl having in each case 1 to 3 carbon atoms, or substituted or unsubstituted phenyl, or sulfo, $R_5$ is alkyl or alkoxy each of which has 1 to 5 carbon atoms, hydroxyl, carboxyl or sulfo, at least two substituents $R_5$ which are different from one another being present in the phenyl ring A, Me is a metal atom attached by coordination, Pc is a (a+b+c)-valent phthalocyanine radical, n is 1 to 3, p is 2 to 4, a is 1 to 2, b is 0.5 to 1.5 and c is 1 to 2, and the total of (a+b+c) is 2.5 to 4.

The substituents $R_1$ and $R_2$, which are identical or different from one another, are hydrogen, hydroxyalkyl having 2 to 5 carbon atoms, for example hydroxyethyl, hydroxy-n-propyl, hydroxy-n-butyl and hydroxy-n-pentyl, and the corresponding branched hydroxyalkyl radicals; carboxyalkyl having 1 to 5 carbon atoms in the alkyl moiety, for example carboxymethyl, carboxyethyl, carboxy-n-propyl, carboxy-n-butyl or carboxy-n-pentyl, and the corresponding carboxyalkyl radicals in which the alkyl moiety is branched; or phenyl.

Preferred substituents $R_1$ and $R_2$ are hydrogen; hydroxyethyl or carboxyalkyl having 1 or 2 carbon atoms in the alkyl radical ($-CH_2COOH$ or $-CH_2CH_2COOH$) or phenyl, and, as a particularly preferred combination, one of the substituents $R_1$ or $R_2$ is hydrogen and the other is one of the substituents indicated.

If $R_1$ and $R_2$, together with the nitrogen atom to which they are attached, form a heterocyclic ring, these are preferably saturated heterocyclic 5-membered or 6-membered rings which can contain, as further hetero atoms, nitrogen, sulfur and/or oxygen atoms. Examples of heterocyclic radicals $-NR_1R_2$ are thus pyrrolidino, piperidino, pipecolino, morpholino, thiomorpholino or piperazino, pyrrolidino, piperidino, morpholino and thiomorpholino being preferred.

$R_3$ is methyl or, preferably, hydrogen.

The following are suitable examples of $R_4$ and $R_5$ as $C_1$-$C_5$alkyl in the compounds of the formula (1):

methyl, ethyl, propyl, isopropyl, n-butyl, isobutyl, sec-butyl, tert-butyl, pentyl or isopentyl. The said alkyl radicals which have 1 to 3 carbon atoms, in particular methyl, are preferred.

The following are suitable examples of $R_4$ and $R_5$ as $C_1$-$C_5$-alkoxy: methoxy, ethoxy, propoxy, isopropoxy, n-butoxy, isobutoxy, sec-butoxy, tert-butoxy, pentoxy or isopentoxy. The said alkoxy radicals which have 1 to 3 carbon atoms, in particular methoxy, are preferred.

Suitable examples of $R_4$ as $-NHCOR_6$ in the compounds of the formula (1) are substituents such as $-NHCOCH_3$, $-NHCOCH_2CH_3$, $-NHCOCH_2CH_2CH_3$, $-NHCOCH_2OH$, $-NHCOCH_2CH_2OH$, $-NHCOCH_2CH_2CH_2OH$ or

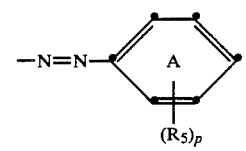, in which the phenyl ring can be unsubstituted or substituted, for example by methyl or halogen. Preferred substituents $-NHCOR_6$ are $-NHCOCH_3$, $-NHCOCH_2OH$ or $-NHCOC_6H_5$.

In the substituents $R_4$ and $R_5$ the meaning sulfo embraces both the free acid form ($-SO_3H$) and the salt form, alkali metal salts (Li, Na or K) or ammonium salts being particularly suitable.

Further substituents $R_5$ are hydroxyl or carboxyl ($-COOH$), there being at least two substituents which are different from one another present in ring A, for example 2 to 4 or, preferably, 2 or 3 of these substituents, for example hydroxyl and carboxyl. p is accordingly a number from 2 to 4 and is preferably 2 or 3.

The radical

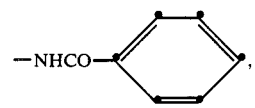

is located, for example, in the meta-position, preferably in the para-position, relative to the group

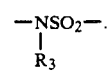

Examples of Me as a metal atom attached by coordination in the compounds of the formula (1) are an iron, cobalt, nickel atom and especially a copper atom.

Pc is short for a (a+b+c)-valent phthalocyanine radical.

The indices a and c preferably have in each case an (average) value of 1 to 1.5, particularly preferably in each case a value of approx. 1; the index b preferably has an (average) value of 0.5 to 1. The total of the indices (a+b) particularly preferably has an (average) value $\leq 2$, especially a value of 1.5.

Preferred compounds of the formula (1) are those in which $R_1$ and $R_2$ are identical or different from one another and are in each case hydrogen, hydroxyethyl or carboxyalkyl having 1 or 2 carbon atoms in the alkyl radical, or phenyl, or $R_1$ and $R_2$, together with the nitrogen atom, are a heterocyclic 5-membered or 6-membered ring which can contain, as further hetero atoms, nitrogen, sulfur and/or oxygen atoms, $R_4$ is alkyl or alkoxy having in each case 1 to 3 carbon atoms, $-NHCOCH_3$, $-NHCOCH_2OH$, $-NHCOC_6H_5$ or sulfo, $R_5$ is alkyl or alkoxy having 1 to 3 carbon atoms, hydroxyl, carboxyl or sulfo, there being two or three substituents $R_5$, of which at least two are different from one another, present in the phenyl ring A, and Me is an iron, cobalt, nickel and especially copper atom which is attached by coordination, and Pc, $R_3$, a, b, c, n and p are as defined above.

Compounds of the formula (1) which are particularly preferred are those of the formula

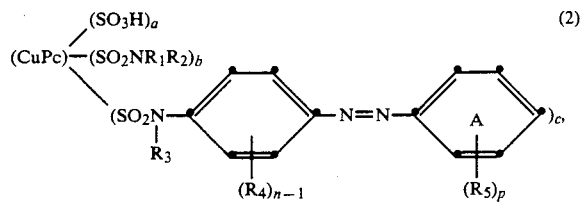

(2)

in which $R_1$ and $R_2$ are identical or different from one another and are in each case hydrogen, hydroxyethyl or carboxyalkyl having 1 or 2 carbon atoms in the alkyl radical, or phenyl, or $R_1$ and $R_2$, together with the nitrogen atom, are a heterocyclic 5-membered or 6-membered ring which can contain, as further hetero atoms, nitrogen, sulfur and/or oxygen atoms, $R_4$ is alkyl or alkoxy having in each case 1 to 3 carbon atoms, $-NHCOCH_3$, $-NHCOCH_2OH$, $-NHCOC_6H_5$ or sulfo, $R_5$ is alkyl or alkoxy having 1 to 3 carbon atoms, hydroxyl, carboxyl or sulfo, there being two or three substituents $R_5$, of which at least two are different from one another, present in the phenyl ring A, and Pc, $R_3$, a, b, c, n and p are as defined above.

Compounds of the formula

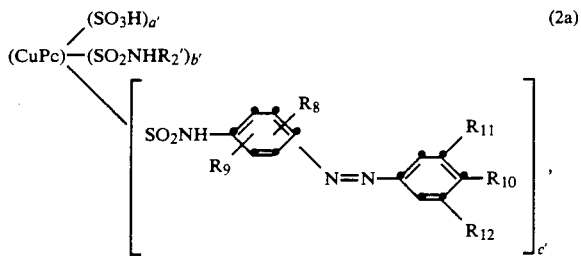

(2a)

in which $R_2'$ is hydrogen, hydroxyethyl or phenyl, $R_8$ is hydrogen, methyl or methoxy, $R_9$ is hydrogen, methyl, methoxy, $-NHCOCH_3$, $-NHCOCH_2OH$ or sulfo, $R_{10}$ is methyl or hydroxyl, $R_{11}$ is carboxyl or sulfo and $R_{12}$ is hydrogen, carboxyl or sulfo, $R_{12}$ being different from $R_{11}$, and a' and c' independently of one another are 1 to 1.5 and b' is 0.5 to 1.0 and the total of (a+b+c) is 2.5 to 4 constitute a particularly preferred embodiment of the present invention.

The process for the preparation of the compounds of the formula (1)—and this is a further subject of the present invention—comprises reacting (subjecting to a condensation reaction) metal phthalocyaninesulfochlorides of the formula

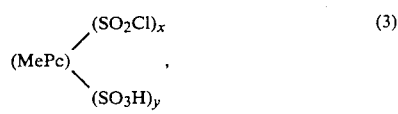

(3)

in which Me is a metal atom attached by coordination, x is 2.5 to 4, y is 0 to 1.5 and the total of (x+y) is less than or equal to 4, and is preferably 3 to 4, especially 3, with compounds containing primary or secondary amino groups of the formulae

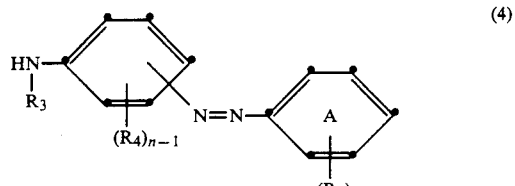

(4)

and

$HNR_1R_2$,  (5)

in which $R_1$, $R_2$, $R_3$, $R_4$, $R_5$, n and p are as defined under formula (1), in an aqueous medium at temperatures from 0° to 100° C. while the pH is maintained at a value from 5 to 10, and then subjecting the products to acid or alkaline hydrolysis, as desired.

The process according to the invention is preferably carried out at 0° to 40° C. and at a pH within the range from 5 to 8. Suitable condensation aids are compounds containing nitrogen, for example pyridine, nicotinic acid or imidazole.

The compounds of the formulae (4) and (5) can be reacted simultaneously or successively with the phthalocyaninesulfochlorides of the formula (3), the latter as a rule being first reacted with the azo dyes of the formula (4) containing amino groups and then with the amines of the formula (5). These compounds are employed in b-fold or c-fold molar amounts, relative to the compound of the formula (3), and preferably also in a 0.1-fold to 1-fold molar excess.

The alkaline hydrolysis can be carried out using alkali metal hydroxides, carbonates or bicarbonates or ammonia or amines; the acid hydrolysis can be carried out using mineral acids, in particular hydrochloric or sulfuric acid.

A further possible means of preparing the compounds of the formula (1) consists in reacting the phthalocyaninesulfochlorides of the formula (3) with a compound of the formula

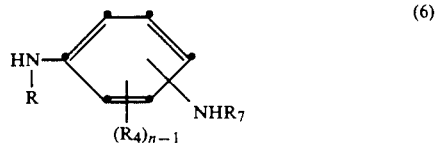

(6)

detaching the protective group $R_7$, for example acetyl, by hydrolysis, diazotizing the resulting amino group and then coupling the product with a coupling component of the formula

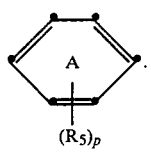

The reaction with the compound of the formula (5) can then be carried out at the same time as the reaction with the compound of the formula (6), or subsequent to the coupling reaction.

The phthalocyaninesulfochlorides of the formula (3) which are used as starting compounds are known to those skilled in the art or can be prepared by processes known per se (reacting the metal phthalocyanine with chlorosulfonic acid and/or thionyl chloride at an elevated temperature) (see, for example, K. Venkataraman, The Chemistry of synthetic dyes, Volume V, page. 261 (1971), Academic Press, New York/London; F. M. Moser, A. L. Thomas, The phthalocyanines, Volume II, pages 20–22, CRC Press; 1983).

The compounds of the formula (4) are similarly known azo dyes, as a rule yellow azo dyes, having a free primary or secondary amino group. The amino compounds of the formula (5) are generally known and are readily accessible.

The present invention also relates to the use of the phthalocyanine compounds of the formula (1), and also, if appropriate, mixtures of these compounds, for dyeing or printing fibre materials containing nitrogen and particularly fibre materials containing hydroxyl groups.

The phthalocyanine compounds according to the invention (phthalocyanineazo dyes) of the formula (1) are thus suitable for dyeing and printing fibre materials containing nitrogen or especially cellulosic fibre materials, preferably textile fibre materials composed of silk, wool or synthetic polyamides, and preferably composed of the cellulosic fibres, such as rayon, cotton or hemp.

As far as their tinctorial properties are concerned, they can be designated substantive or direct dyes (C.I. direct dyes).

It is also possible to dye textile fibre materials composed of mixed fibres, for example wool/cotton, polyamide/cotton, polyacrylic/cotton or especially polyester/cotton mixed fibres, by one-bath dyeing methods and in the presence of dyes for each of the other types of fibre.

The textile fibre materials can be in a very wide variety of processing states, for example as fibre, yarn, woven fabric or knitted fabric.

As well as the textile substrates, it is also possible to dye leather and paper with compounds (dyes) according to the invention of the formula (1).

Level dyeings are obtained in brilliant green colour shades having good overall fastness properties, in particular good fastness properties to rubbing, wet processing, wet rubbing, perspiration and light. If necessary, the wet fastness properties, in particular the fastness to washing, of the resulting direct dyeings and prints can be improved appreciably by an after-treatment with so-called fixing agents.

The dyes, according to the invention, of the formula (1) can readily be combined with other dyes, in particular disperse dyes. The dyes according to the invention exhibit an adequate stability to high temperatures and can thus be used for dyeing under the dyeing conditions for polyester fibres, i.e. at temperatures in the range from about 100° to 150° C., preferably from 110° to 130° C., from an aqueous liquor and at a pH of 4 to 7.5, preferably 5 to 7.

It is thus possible to employ customary disperse dyes together with the dyes, according to the invention, of the formula (1) in a one-stage, one-bath process for dyeing polyester/cotton mixed fibres (mixed fabrics), both types of fibre being dyed evenly and fast by the respective dye. If a disperse dye having the same shade as that displayed by the dye according to the invention is used, it is also possible to obtain matching dyeings.

The provision of the dyes, according to the invention, of the formula (1) makes it possible to simplify considerably the dyeing of textile mixed fibres (mixed fabrics), for example those composed of polyester and cellulose fibres. The dyeing, customary per se, of each type of fibre in a mixture of fibres in a separate operation using different dyeing conditions is thus no longer necessary.

The compounds, according to the invention, of the formula (1) are also suitable for the preparation of aqueous inks for ink jet printing.

The following examples serve to illustrate the invention. Parts and percentages are by weight, unless stated otherwise. Parts by weight and parts by volume are in the same relation to one another as kilograms and liters. The temperatures are quoted in degrees centigrade.

EXAMPLE 1

17.4 parts of copper phthalocyaninetrisulfochloride are stirred up in 30 parts of water. This gives a suspension to which 12.8 parts of 3-carboxy-4-hydroxy-4'-aminoazobenzene (sodium salt) are added. The reaction mixture is stirred for 8 hours at 45° C. The pH is kept at a value of 6.5 to 7.0 by adding 1N aqueous ammonia solution. About 80 parts by volume of the ammonia solution are required.

When the reaction is complete, the resulting dye is precipitated by means of 15 g of sodium chloride and is filtered off and washed first with 5% aqueous sodium chloride solution and then with ethanol until a colourless filtrate is obtained.

22 parts of the crude dye of the formula

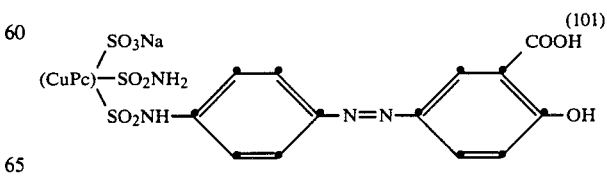

(101)

are obtained.

The dyes of the formulae

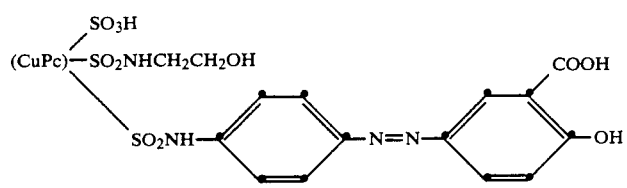

(102)

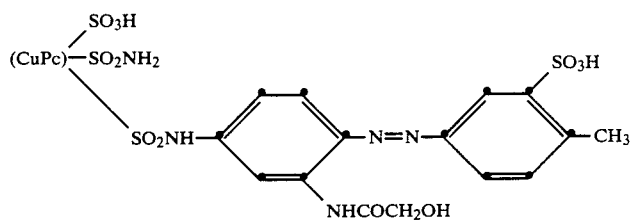

(103)

and

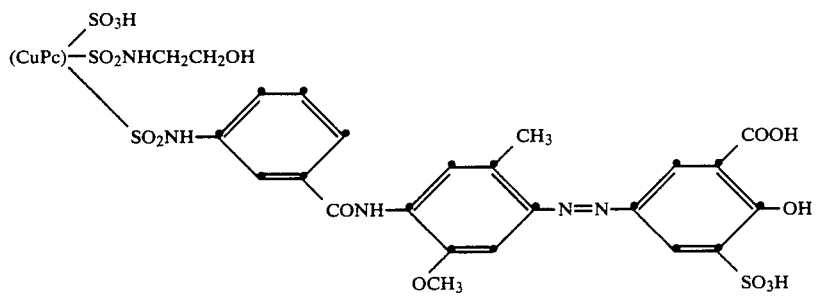

(104)

can also be prepared analogously.

EXAMPLE 2

17.4 parts of copper phthalocyaninetrisulfochloride are stirred up in 300 parts of ice-water. This gives a suspension to which 12.8 parts of 3-carboxy-4-hydroxy-4'-aminoazobenzene (sodium salt) are added. The reaction mixture is stirred for 8 hours at 45° C. The pH is kept at a value of 7.0 to 7.6 by adding 1N aqueous ammonia solution. About 80 parts by volume of the ammonia solution are required. When the reaction is complete the resulting dye is precipitated by means of 30 parts of sodium chloride and is filtered off and washed first with 5% aqueous sodium chloride solution and then with ethanol until a colourless filtrate is obtained.

22 parts of the crude dye of the formula

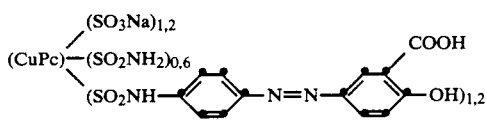

are obtained after drying.

EXAMPLE 3

16.3 parts of a copper phthalocyaninesulfochloride containing on average approx. 1.8 sulfochloride groups and 0.8 sulfonic acid groups per molecule are stirred up in 300 parts of water. 7.8 parts of the monoazo dye 3-carboxy-4-hydroxy-4'-aminoazobenzene (sodium salt) and 0.25 part of pyridine are added to this suspension. The reaction mixture is then stirred for 3 hours at 0° to 5° C., then for 2 hours at 15° to 20° C. and finally for 2 hours at 35° to 40° C., and the pH is kept at a value of approx. 8.2 during the reaction by adding 1N ammonia solution. When the reaction is complete, the dye is salted out by means of sodium chloride, filtered off, washed first with sodium chloride solution and then with ethanol and dried. The resulting dye of the formula

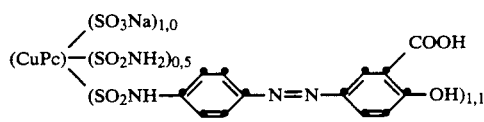

dyes cellulose and leather in brilliant bluish-tinged green shades of good fastness to light.

EXAMPLE 4

43.6 parts of a copper phthalocyaninesulfochloride containing on average approx. 1.7 sulfochloride groups and approx. 1.0 sulfonic acid groups per molecule are suspended in 750 parts of ice-water. 20 parts of the monoazo dye 3-carboxy-4-hydroxy-5'-methoxy-2'-methyl-4'-aminoazobenzene (sodium salt) and 0.5 part of pyridine are added to this suspension. The reaction mixture is then stirred for 4 hours at 0°–5° C., then for 1 hour at 10° C., 1 hour at 10° C. and finally for 2 hours at 40° C.; the pH is kept at a value of 8.5 to 8.7 during the reaction by adding 2N aqueous ammonia solution. When the reaction is complete, the resulting dyestuff is salted out by means of sodium chloride, filtered off and washed first with aqueous sodium chloride solution and then with ethanol. 60 parts of the crude dye of the formula

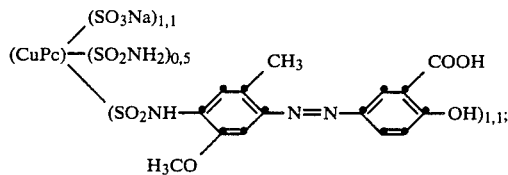

are obtained after drying.

The dye dyes cellulose materials and leather in brilliant green shades of good fastness to light and, in particular after an after-treatment with cationic fixing agents, good wet fastness properties.

EXAMPLE 5

23.1 parts of copper phthalocyanine base (sodium salt) containing approx. 1.1 sulfonic acid groups, approx. 0.7 -SO$_2$NH$_2$ group and approx. 1.1 groups of the formula

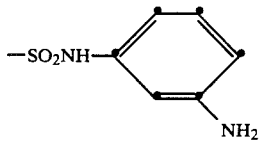

per molecule (prepared in a manner known per se by sulfochlorination of copper phthalocyanine and subsequent reaction of the product with ammonia and 3-aminoacetanilide, followed by elimination of the acetyl protective group) are added to a solution of 2 parts of sodium nitrite in 200 parts of water. After 100 parts of ice have been added, a solution of 14 parts of 30% hydrochloric acid in 50 parts of ice-water is added dropwise, with stirring, at 0° to 2° C. The suspension of the diazonium salt is then added dropwise at 0° to 4° C. to a solution of 22.9 parts of salicylic acid (sodium salt) in 200 parts of ice-water. The pH of the reaction mixture is kept at a value of approx. 8.5 during the coupling reaction by adding 30% sodium hydroxide solution. When the reaction is complete, sodium chloride is added to the reaction solution, and the dye which has been salted out is filtered off, washed with sodium chloride solution and dried. This gives the dyestuff of the formula

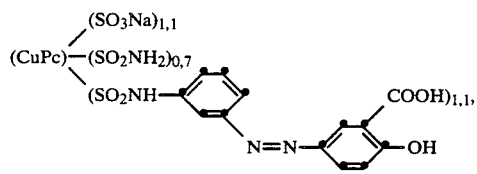

which dyes cellulose materials and leather in bluish-tinged, brilliant green shades of good fastness to light.

EXAMPLES 6 to 16

The following dyes, which dye cellulose materials and leather in each case in brilliant green shades of good overall fastness properties can be prepared analogously to the procedure described in Examples 1 to 5:

| Example No. | Dye |
|---|---|
| 6 | (CuPc)$-$(SO$_3$Na)$_{1,4}$ / (SO$_2$NH$-$CH$_2$$-$CH$_2$$-$OH)$_{1,0}$ \ (SO$_2$NH$-$⟨C$_6$H$_4$⟩$-$N=N$-$⟨C$_6$H$_3$(COOH)⟩$-$OH)$_{1,2}$ |
| 7 | (CuPc)$-$(SO$_3$Na)$_{1,1}$ / (SO$_2$NH$-$⟨C$_6$H$_5$⟩)$_{0,5}$ \ (SO$_2$NH$-$⟨C$_6$H$_4$⟩$-$N=N$-$⟨C$_6$H$_3$(COOH)⟩$-$OH)$_{1,1}$ |
| 8 | (CuPc)$-$(SO$_3$Na)$_{1,1}$ / (SO$_2$NH$_2$)$_{0,6}$ \ (SO$_2$NH$-$⟨C$_6$H$_4$⟩$-$N=N$-$⟨C$_6$H$_2$(COOH)(SO$_3$Na)⟩$-$OH)$_{1,1}$ |
| 9 | (CuPc)$-$(SO$_3$Na)$_{1,1}$ / (SO$_2$NH$_2$)$_{0,5}$ \ (SO$_2$NH$-$⟨C$_6$H$_3$(CH$_3$)⟩$-$N=N$-$⟨C$_6$H$_2$(COOH)(SO$_3$Na)⟩$-$OH)$_{1,1}$ |
| 10 | (CuPc)$-$(SO$_3$Na)$_{1,2}$ / (SO$_2$NH$_2$)$_{0,7}$ \ (SO$_2$NH$-$⟨C$_6$H$_2$(H$_3$CO)(CH$_3$)⟩$-$N=N$-$⟨C$_6$H$_2$(COOH)(SO$_3$Na)⟩$-$OH)$_{1,3}$ |
| 11 | (CuPc)$-$(SO$_3$Na)$_{1,2}$ / (SO$_2$NH$_2$)$_{0,6}$ \ (SO$_2$NH$-$⟨C$_6$H$_3$(NHCOCH$_3$)⟩$-$N=N$-$⟨C$_6$H$_2$(COOH)(SO$_3$Na)⟩$-$OH)$_{1,0}$ |
| 12 | (CuPc)$-$(SO$_3$Na)$_{1,1}$ / (SO$_2$NH$_2$)$_{0,5}$ \ (SO$_2$NH$-$⟨C$_6$H$_3$(NHCOCH$_3$)⟩$-$N=N$-$⟨C$_6$H$_3$(SO$_3$Na)⟩$-$CH$_3$)$_{1,1}$ |
| 13 | (CuPc)$-$(SO$_3$Na)$_{1,2}$ / (SO$_2$NH$_2$)$_{0,6}$ \ (SO$_2$NH$-$⟨C$_6$H$_3$(NHCOCH$_2$OH)⟩$-$N=N$-$⟨C$_6$H$_3$(SO$_3$Na)⟩$-$CH$_3$)$_{1,0}$ |

| Example No. | Dye |
|---|---|
| 14 | (CuPc)—(SO₃Na)₁.₃ / (SO₂NH₂)₀.₆ / (SO₂NH—Ar(H₃CO)—N=N—Ar(SO₃Na)—CH₃)₁.₀ |
| 15 | (CuPc)—(SO₃Na)₁.₁ / (SO₂NH₂)₀.₆ / (SO₂NH—Ar(CH₃)—N=N—Ar(SO₃Na)—CH₃)₁.₄ |
| 16 | (CuPc)—(SO₃Na)₁.₂ / (SO₂NH₂)₀.₇ / (SO₂NH—Ar—SO₃Na, N=N—Ar(COOH)—OH)₁.₀ |

Dyeing Instructions 1

10 parts of cotton fabric (bleached and mercerized) are introduced at approx. 30° C. into a dyebath containing 200 parts of water and 0.35 part of the dye of Example 2. The liquor is heated to 95° C. in the course of 30 minutes and is kept at this temperature for 15 minutes. 4 parts of sodium sulfate decahydrate are then added and dyeing is continued for a further 45 minutes at 95° C. The dyebath is then cooled to 80° C. in the course of 15 minutes and is kept at this temperature for a further 15 minutes. The dyeing is then thoroughly rinsed with cold water and is dried.

Dyeing Instructions 2

10 parts of a fibre mixture composed of polyester and cotton are introduced at approx. 50° C. into a dyebath containing 200 parts of water, a mixture of dyes consisting of 0.05 part of C.I. Disperse Yellow 99, 0.5 part of C.I. Disperse Blue 60 and 0.2 part of the dye according to Example 2, 0.4 part of ammonium sulfate and 0.2 part of an anionic dispersing agent (for example the formaldehyde condensation product of naphthalenesulfonic acid). The pH of the dyebath is adjusted to a value of 5.5 with formic acid, 1 part of sodium sulfate decahydrate is added and the dyebath is then heated to approx. 130° C. in the course of 45 minutes. Dyeing is continued for a further 45 minutes at 130° C. and the dyebath is then cooled to approx. 80° C. in the course of 30 minutes and is kept at this temperature for a further 45 minutes. The dyeing is then thoroughly rinsed with cold water and is dried.

Dyeing Instructions 3

The procedure described in Dyeing Instructions 1 or 2 is repeated, except that after the conclusion of the dyeing process the dyeing is put, after cold rinsing, into a fresh bath warmed to approx. 30° C. and containing 200 parts of water and 0.2–0.6 part of a cationic after-treatment agent (an amine-formaldehyde-dicyandiamide condensation product or a formulation based on dicyandiamide and diethylenetriamine). The dyeing is subjected to after-treatment for 30 minutes at 30° C. and is then dried without a further rinsing process; a dyeing having improved wet fastness properties is obtained.

Dyeing Instructions 4

The procedure described in Dyeing instructions 1 or 2 is repeated, except that after the conclusion of the dyeing process the dyeing is put, after cold rinsing, into a fresh bath, warmed to approx. 25° C. and containing 200 parts of water, 1 part of sodium sulfate decahydrate and 0.6 part of a fibre-reactive, cationic after-treatment agent based on an N-methyldialkylamine and epichlorohydrin. The temperature is raised to 40° C. in the course of 15 minutes, 0.8 part of 30% sodium hydroxide solution is added and the dyeing is subjected to treatment for a further 45 minutes at 40° C. The dyeing is finally given a hot rinse and dried; it has improved wet fastness properties.

What is claimed is:

1. A compound of the formula

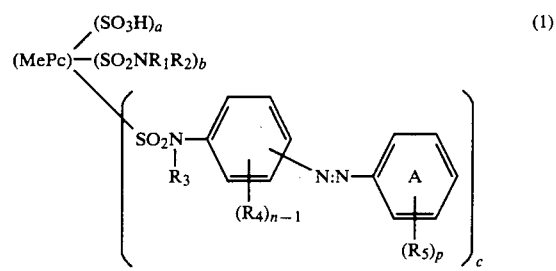

(1)

in which $R_1$ and $R_2$ are identical or different and in each case are hydrogen, hydroxyalkyl having 2 to 5 carbon atoms or carboxyalkyl having 1 to 5 carbon atoms in the alkyl radical or phenyl, or $R_1$ and $R_2$ together with the nitrogen atom to which they are bound represent a pyrrolidinyl, piperidinyl, morpholinyl or thiomorpholinyl radical, $R_3$ is hydrogen or methyl, $R_4$ is alkyl or alkoxy each of which has 1 to 5 carbon atoms, —NHCOR₆ in which $R_6$ is alkyl or hydroxyalkyl having in each case 1 to 3 carbon atoms, or unsubstituted or methyl- or halogen-substituted phenyl, or sulfo, $R_5$ is alkyl or alkoxy each of which has 1 to 5 carbon atoms, hydroxyl, carboxyl or sulfo, at least two substituents $R_5$ which are different from one another being present in the phenyl ring A, Me is an iron, cobalt, nickel or copper atom attached by coordination, Pc is (a+b+c)-valent phthalocyanine radical, n is 1 to 3, p is 2 to 4, a is 1 to 1.5, b is 0.5 to 1, c is 1 to 1.5, and the total of (a+b+c) is 2.5 to 3.

2. A compound according to claim 1, wherein $R_1$ and $R_2$ are identical or different from another and are in each case hydrogen, hydroxyethyl or carboxyalkyl having 1 or 2 carbon atoms in the alkyl radical, or phenyl, or $R_1$ and $R_2$, together with the nitrogen atom, are a pyrrolidinyl, piperidinyl, morpholinyl or thiomorpholinyl radical, $R_4$ is alkyl or alkoxy having in each case 1 to 3 carbon atoms, —NHCOCH$_3$, —NHCOCH$_2$OH, —NHCOC$_6$H$_5$ or sulfo, or alkoxy having 1 to 3 carbon atoms, there being two or three substituents $R_5$, of which at least two are different from another, present in the phenyl ring A, and Me is a copper atom which is attached by coordination.

3. A compound according to claim 1, which has the formula

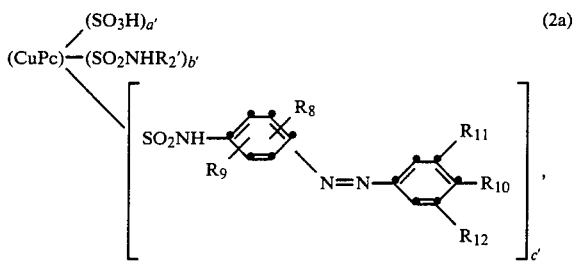
(2a)

in which $R_2'$ is hydrogen, hydroxyethyl or phenyl, $R_8$ is hydrogen, methyl or methoxy, $R_9$ is hydrogen, methyl, methoxy, —NHCOCH$_3$, —NHCOCH$_2$OH or sulfo, $R_{10}$ is methyl or hydroxyl, $R_{11}$ is carboxyl or sulfo and $R_{12}$ is hydrogen, carboxyl or sulfo, $R_{12}$ being different from $R_{11}$, and $a'$ and $c'$ independently of one another are 1 to 1.5 and $b'$ is 0.5 to 1.0 and the total of ($a'+b'+c'$) is 2.5 to 4.

4. A compound according to claim 1, which has the formula

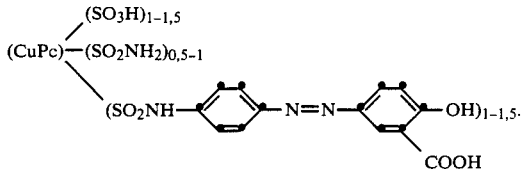

5. A compound according to claim 1, which has the formula

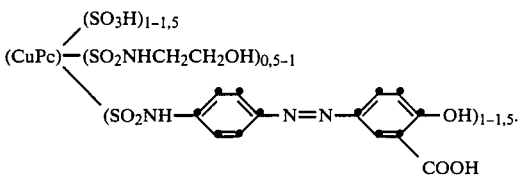

6. A compound according to claim 1, which has the formula

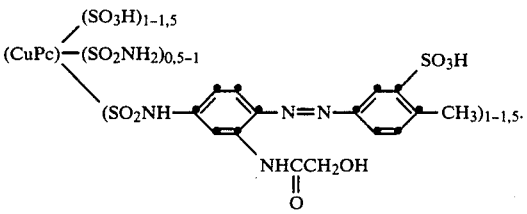

* * * * *